(12) United States Patent
Steidle

(10) Patent No.: US 8,771,110 B2
(45) Date of Patent: *Jul. 8, 2014

(54) BALL

(75) Inventor: Volker Peter Steidle, Fuzhou (CN)

(73) Assignee: adidas International Marketing B.V., Amsterdam ZO (NL)

( * ) Notice: Subject to any disclaimer, the term of this patent is extended or adjusted under 35 U.S.C. 154(b) by 93 days.

This patent is subject to a terminal disclaimer.

(21) Appl. No.: 13/617,712

(22) Filed: Sep. 14, 2012

(65) Prior Publication Data

US 2013/0012345 A1 Jan. 10, 2013

Related U.S. Application Data

(63) Continuation of application No. 12/621,148, filed on Nov. 18, 2009, now Pat. No. 8,292,764.

(30) Foreign Application Priority Data

Nov. 25, 2008 (DE) .................. 10 2008 058 821

(51) Int. Cl.
*A63B 43/00* (2006.01)
*A63B 41/00* (2006.01)

(52) U.S. Cl.
USPC ............................ 473/570; 473/610; 473/611

(58) Field of Classification Search
USPC .......... 473/570, 571, 593, 603, 604, 610, 611
See application file for complete search history.

(56) References Cited

U.S. PATENT DOCUMENTS

| 1,518,901 | A |   | 12/1924 | Collins et al. |   |
|---|---|---|---|---|---|
| 1,927,725 | A |   | 9/1933 | Tompkins |   |
| 2,080,894 | A |   | 5/1937 | Levison |   |
| 2,183,900 | A |   | 12/1939 | Voit |   |
| 2,295,804 | A | * | 9/1942 | Olson | 473/610 |
| 2,387,455 | A |   | 10/1945 | McDermott |   |
| 2,600,862 | A |   | 6/1952 | Fenton |   |
| 2,710,622 | A |   | 6/1955 | Chupa |   |
| 3,204,959 | A |   | 9/1965 | Nicholls |   |
| 3,220,729 | A |   | 11/1965 | Whittington |   |
| 3,905,387 | A |   | 9/1975 | Grant |   |
| 4,320,776 | A |   | 3/1982 | Yang |   |
| 4,568,081 | A | * | 2/1986 | Martin | 473/611 |
| 4,577,865 | A | * | 3/1986 | Shishido | 473/570 |
| 5,358,001 | A |   | 10/1994 | Smith |   |
| 5,755,634 | A |   | 5/1998 | Huang |   |
| 5,856,619 | A |   | 1/1999 | Wang |   |
| 5,915,407 | A |   | 6/1999 | West |   |
| 6,055,854 | A |   | 5/2000 | Chen |   |
| 6,547,703 | B1 |   | 4/2003 | Swezey et al. |   |
| 7,175,553 | B2 |   | 2/2007 | Laliberty et al. |   |
| 7,740,551 | B2 | * | 6/2010 | Nurnberg et al. | 473/570 |

(Continued)

FOREIGN PATENT DOCUMENTS

| DE | 2020916 | 11/1970 |
|---|---|---|
| DE | 3221749 | 12/1983 |

(Continued)

*Primary Examiner* — Steven Wong
(74) *Attorney, Agent, or Firm* — Sterne, Kessler, Goldstein & Fox P.L.L.C.

(57) ABSTRACT

A valve for a ball includes a casing and a core. The core is arranged at least partially inside the casing. The core comprises a first sealing area with a plurality of sections which have alternating concave and convex curvatures.

15 Claims, 7 Drawing Sheets

(56) References Cited

U.S. PATENT DOCUMENTS

| | | | |
|---|---|---|---|
| 8,231,487 B2* | 7/2012 | Nurnberg et al. | 473/570 |
| 8,292,764 B2* | 10/2012 | Steidle | 473/611 |
| 8,512,177 B2* | 8/2013 | Krysiak et al. | 473/570 |
| 8,517,869 B2* | 8/2013 | Steidle | 473/570 |
| 2003/0224885 A1* | 12/2003 | Leal et al. | 473/570 |
| 2005/0288134 A1* | 12/2005 | Smith | 473/570 |
| 2006/0135297 A1* | 6/2006 | Cruciani | 473/570 |
| 2006/0264278 A1 | 11/2006 | Horton et al. | |
| 2007/0060425 A1* | 3/2007 | Kuenzler et al. | 473/570 |
| 2007/0281811 A1 | 12/2007 | Wang | |
| 2008/0274844 A1* | 11/2008 | Ward | 473/570 |
| 2009/0048044 A1* | 2/2009 | Oleson et al. | 473/570 |
| 2010/0130315 A1* | 5/2010 | Steidle | 473/570 |
| 2010/0130316 A1* | 5/2010 | Steidle | 473/593 |
| 2010/0184563 A1* | 7/2010 | Molyneux et al. | 482/1 |
| 2010/0222165 A1* | 9/2010 | Nurnberg et al. | 473/609 |
| 2010/0227705 A1* | 9/2010 | Huang | 473/353 |
| 2011/0118062 A1* | 5/2011 | Krysiak et al. | 473/570 |
| 2011/0118064 A1* | 5/2011 | Krysiak et al. | 473/603 |
| 2011/0118065 A1* | 5/2011 | Krysiak et al. | 473/603 |
| 2012/0244969 A1* | 9/2012 | Binder | 473/570 |

FOREIGN PATENT DOCUMENTS

| | | |
|---|---|---|
| DE | 19506502 | 8/1996 |
| DE | 19800796 | 7/1999 |
| DE | 10338620 | 3/2005 |
| DE | 10361826 | 7/2005 |
| DE | 102007013025 | 7/2008 |
| WO | WO97/02868 | 1/1997 |
| WO | WO98/30289 | 7/1998 |

* cited by examiner

BALL

CROSS-REFERENCE TO RELATED APPLICATION

This is a continuation of U.S. application Ser. No. 12/621,148, filed Nov. 18, 2009, now U.S. Pat. No. 8,292,764, which is incorporated herein in its entirety, by reference thereto.

BACKGROUND OF THE INVENTION

1. Field of the Invention

The present invention relates to a valve for ball. Further, the present invention relates to a method of manufacture of a valve for a ball.

2. Background Art

Balls are provided with valves in order to inflate them after manufacture using a pump, in order to achieve a required pressure inside the ball. However, known balls and valves are not completely air tight so that the ball has to be inflated again and again over the course of time. This holds true in particular when the ball is subject to strong deformations during use, for example in the case of footballs or soccerballs.

Conventional valves for a ball consist of a casing and a core. The casing and the core are separately manufactured, usually from rubber or rubber mixtures. During assembly of the valve, the core is pressed into the casing by applying a considerable force.

Such a valve for a ball is described, for example, in DE 198 00 796 A1. The core of this valve is provided with an angular projection which has a rectangular shape in a cross section. The angular projection engages a groove of the casing so that the core is fixed in the casing. A similar construction is described in U.S. Pat. No. 5,915,407.

Further, U.S. Pat. No. 4,568,081 discloses a core in which a section with increased diameter has semicircular recesses which engage corresponding ribs on the casing.

DE 32 21 749 A1 describes a plug which seals the opening above a valve in order to improve air tightness and minimize leaking. The plug may comprise rounded projections. For inflating the ball, the plug can be taken out or pushed aside. However, the plug does not improve the air tightness of the valve itself.

U.S. Pat. No. 2,295,804 describes a two-part valve comprising a casing and a plug of such construction that the casing may be incorporated in the ball during its manufacture, and the plug thereafter inserted when inflation is desired.

The known valves for balls therefore have various disadvantages. Projections of the core indeed increase the surface of the core and may increase air tightness between the core and casing. On the other hand, it has been found that angular and rectangular projections and recesses of the core and the casing respectively make it easier for air to get out, for example due to deformations caused by strong forces acting on the ball.

Further, projections of the core cause deformations of the casing when the core is pressed into the casing during assembly of the valve. These deformations may damage the casing and reduce air tightness. In addition, the core may be damaged during insertion.

It is not just sufficient for a ball that is used during sports to have an airtight valve. Rather, the ball also has to have the proper pressure. Therefore, it should be possible to check the pressure in the ball in a simple way and to adjust it if necessary, even before its mobility and reactions are negatively affected. It is further known to provide a ball with a pressure sensor and to display the pressure.

For example, U.S. Pat. No. 4,577,865 describes a ball with a sensor for detecting an external force acting on the ball which has a display for a numerical value. U.S. Pat. No. 6,547,703 describes a training ball with a pressure sensor and a mechanical or electronic pressure display. Another pressure display for a ball is described in U.S. Pat. No. 5,755,634. Pressure sensors and displays are also known for tires and are described, for example, in U.S. Pat. No. 6,055,854 and U.S. Pat. No. 5,856,619.

The German patent application DE 10 2007 013 025 A1 discloses a ball with a pressure sensor wherein the measured pressure is displayed by a LED (light emission diode) which is attached to a transparent valve. Power supply shall be provided by an accumulator or a battery.

However, this document leaves open how the accumulator shall be provided with energy and how to realize this complex system inside the ball without impairing its smoothness of motion.

It is therefore the problem of the present invention to overcome the disadvantages of the prior art and to provide in particular a valve for a ball with improved air tightness and a method of manufacture of such a valve. A further problem of the invention is to provide a ball which not only has improved air tightness, but which also enables a user to check the air tightness reliably.

BRIEF SUMMARY OF THE INVENTION

The present invention solves these problems in a first embodiment by a method of manufacturing a valve for a ball wherein the valve comprises a core and a casing. In the first step of the method the core is produced from a first elastic material. In the second step, the casing is formed from a second material around the core.

In contrast to the prior art, the valve is formed without the step of inserting the core into the casing. This avoids deformations of the core and in particular of the casing which inevitably occur during insertion and which may lead to air leakage.

In some embodiments the core is arranged in a mold after its production, i.e. after the first step, and in the second step the casing is formed in the mold by injection molding. In some embodiments the casing may be injected using high pressure in order to improve air tightness. Use of a mold enables the application of advantageous shaping techniques of which injection molding is particularly advantageous. However, other techniques such as pressing or extruding are conceivable. Application of the mentioned technologies enables the casing to be formed around the core so that it is not necessary to subsequently insert the core into the casing.

In an alternative method, the casing is produced in a first step by injection molding, wherein the casing includes a cavity. In a second step the core may be produced in the cavity under pressure.

In some embodiments, the core may be fixed in the mold by a fixture during forming. This enables precise positioning of the core with respect to the casing which is important for a proper functioning of the valve.

In some embodiments, the second material, i.e., the material of the casing, may be substantially transparent. This may enable the arrangement of lighting means, in particular light emitting diodes (LEDs), in recesses of the casing so that their light can be emitted through the casing to the outside. Lighting means arranged in such a way are therefore protected and do not need a separate housing. The lighting means can be used for displaying states or values of an electronic device in the ball, for example a pressure sensor.

In some embodiments, the second material may be elastic, such as for example, thermoplastic polyurethane (TPU).

In some embodiments, the first elastic material, i.e. the material of the core, comprises a rubber material. In an alternative embodiment the first elastic material comprises TPU. Both embodiments therefore achieve high leak tightness of the valve also in the case of deformations, due to the elasticity of the material.

A further aspect of the present invention relates to a valve for a ball which comprises a casing and a core arranged at least partially inside the casing. The core comprises a first sealing area with a plurality of sections which have an alternating concave and convex curvature.

As explained above, angular and rectangular projections and recesses, of the core and the casing respectively according to the prior art lead to air leakage through the valve. One reason may be that deformations of the valve forces act on the surfaces of the core and the casing which touch each other. These forces generally lead to a deformation of the elastic material. However, in case of plane surfaces and edges, i.e. discontinuous curvatures of the surface, a component of the force parallel to the surfaces may cause displacement of the two surfaces with respect to each other. This displacement may further cause, typically at an edge, a cavity between the two surfaces which may then lead to leakage of air.

This problem of leakage may according to this aspect of the present invention be solved in that the core comprises a first sealing area with a plurality of alternating concave and convex sections. The alternating curvature of the surface substantially reduces the risk that forces acting on the core lead to a displacement with respect to the casing, and vice versa. This avoids the creation of cavities and therefore leakage of air.

In some embodiments, the casing comprises a second sealing area wherein the second sealing area engages the first sealing area and wherein the curvature of the second sealing area essentially corresponds to the curvature of the first sealing area. In this case, due to the engagement, the first and the second sealing area form a closed curved contact surface which is integrally deformed when forces act thereon without that two surfaces being displaced with respect to each other.

In some embodiments, the first sealing area is continuously curved, i.e., the surface of the first sealing area has no edge or "kink". As explained above, this reduces the possibility of air leakage in case of displacements between the first and second sealing area. This also avoids the risk that an edge or a kink of the surface of the core damages the casing, in case the valve is manufactured by inserting the core into the casing.

In some embodiments, the curvature radius of the convex section and the curvature radius of the concave section may be substantially equal. This simplifies the manufacture. For example, it leads to a simpler shape of the mould for the core.

In some embodiments, at least one of the plurality of convex and concave sections comprises a substantially semicircular cross section. This shape may lead to a maximum contact surface between the first and second sealing area and to an optimum engagement between the two sealing areas, and thus improved air tightness. In some embodiments, each of the plurality of convex and concave sections comprises a substantially semicircular cross section.

In a further embodiment, the core comprises at least one third sealing area with a first edge which engages a corresponding second edge of the casing. Despite the previous statements it can be advantageous that, in addition to the curved surfaces of the first and second sealing area, a first edge in the at least one third sealing area of the core engages a second edge of the casing. This may provide a precise positioning of the core inside the casing.

In some embodiments, the diameter of the third sealing area may be larger than the diameter of the first sealing area. The larger the diameter of the third sealing area, the larger is the resistance against displacement forces which act along the longitudinal axis of the valve. Such forces occur in particular during inflation of a ball when the pump for a ball is inserted into the valve.

In a further embodiment, the third sealing area may be arranged in an outer section of the core. In this area a fine positioning of the core with respect to the casing may be particularly important since a pump for a ball enters the core exactly at this point where it exerts strong forces on the core.

In a further embodiment, the casing comprises at its outer end a cover area which has a larger diameter than the inner end of the casing. This cover area may provide a large area for a tight connection of the casing with the bladder of the ball.

In a further embodiment, at least one recess for receiving at least one lighting means, in particular at least one LED (light emitting diode), may be arranged at the outer end of the casing. Therefore, the casing can be used as housing for the lighting means which emits its light through the outer end of a preferably transparent casing to the outside. Also, a separate housing for the lighting means is not needed.

In a further embodiment, the housing comprises a recess for an electromagnetic coil which may be arranged at the inner end of the casing. The coil can be used to inductively charge an energy storage, for example an accumulator or a capacitor, inside a ball. In this way, a very simple possibility for power supply inside the ball is provided without requiring a separate electromagnetic coil or a connector for external charging of the energy storage. The arrangement at the inner end of the casing may be advantageous since it avoids interference with the layers of the ball and therefore avoids problems of air leakage.

A further aspect of the invention relates to a ball with the valve described above. Preferably, the ball comprises an electromagnetic coil which is arranged in the previously described recess of the casing. Further, the ball comprises an electronic device and an energy storage which can be inductively charged by the electromagnetic coil. In some embodiments, the electronic device comprises a pressure sensor.

In an alternative to the arrangement of the electromagnetic coil at the casing, the electromagnetic coil may be arranged at a bladder of a ball, for example in a circular arrangement around the valve.

Such a ball not only has a particularly air tight valve, but also provides the ability to check the pressure inside the ball. If necessary, the pressure can be corrected before the functional properties of the ball are impaired.

In some embodiments, the electromagnetic coil serves as a counter weight to the electronic device for balancing the ball. In general, in order not to impair the smoothness of the motion of a ball, devices inside the ball have to be balanced by counter weights. Arranging the electromagnetic coil at the valve not only saves a component which would need balancing, but the coil itself can be used as a variable counter weight for balancing the electronic device at the opposite side of the bladder by varying the dimensions of the electromagnetic coil (material, wire thickness, number of windings and others).

In a further embodiment, at least one lighting means may be arranged in the at least one recess of the casing as a display of the electronic device. In some embodiments a first lighting means displays a pressure in the ball is too high or to low (i.e., the pressure is inadequate), and a second lighting means displays a pressure in the ball is adequate. Lighting means such as LEDs provide a very simple possibility for the display of functional states which therefore can be rapidly recognized. This enables at any time a direct and effective feedback about the present state of the pressure of the ball. Another possibility is the use of a single lighting means for displaying the pressure or other information.

BRIEF DESCRIPTION OF THE DRAWINGS/FIGURES

Embodiments of the present invention are described in more detail by reference to the accompanying drawings.

DETAILED DESCRIPTION OF THE INVENTION

The following embodiments of the present invention are described in more detail using an example of a valve for a ball, a method of manufacture of a valve and a ball with this valve. It is to be understood that the present invention can be applied to any type of ball for sports such as a football (e.g. a soccer-ball), handball, basketball, American football and others.

Figure 1:
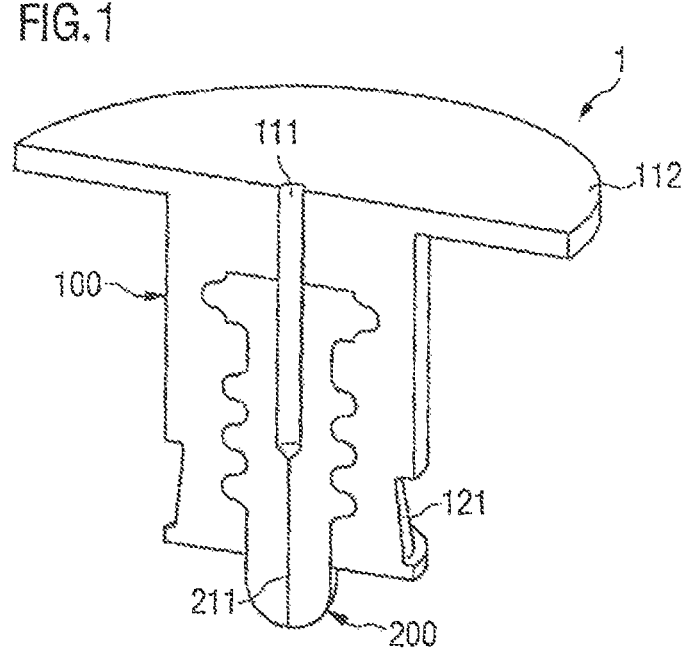
FIG. 1 is a perspective view of a cross section of an embodiment of a valve for a ball according to the present invention.

FIG. 1 is a perspective view of a cross section of a valve for a ball. In FIG. 1 a valve 1 having a casing 100 and a core 200 can recognized. Core 200 may be at least partially arranged inside casing 100. Casing 100 may include a cover area 112 and a recess 121.

Cover area 112 may have a substantially larger diameter than the rest of casing 100 and thereby may enable an extensive and therefore tight connection between casing 100 with a ball. For example, cover area 112 may overlay a bladder of a ball so that the rest of casing 100 extends into the bladder through an opening in the bladder. This opening is covered by cover area 112 which provides an airtight seal.

Casing 100 may include a hole 111 which extends into the core 200 for inflating the ball. Core 200 may have a thin pipe 211 that may be aligned with and be an extension of hole 111, in order to enable insertion of the needle-like top of a pump for a ball into the interior of the ball. Thin pipe 211 may be compressed by the elastic material of the core 200 so that no air can leak through thin pipe 211. As can also be recognized in FIG. 1, casing 100 encloses core 200 so that a contact surface along an exterior of core 200 and a contact surface along an interior of casing 100 are in intimate contact so that leakage of air between the contact surfaces of casing 100 and core 200 is minimized and/or prevented.

Recess 121 serves as a receptacle for windings of an electromagnetic coil 310 (see FIG. 4) which can be used to induc- tively charge an energy storage 320 (see FIG. 4) arranged inside the ball. This enables operation of an electronic device 330 (see FIG. 4) which may comprise a pressure sensor, an acceleration sensor, a temperature sensor and further sensors and circuitry for measuring properties of the ball, its position and its motion.

Figure 2:
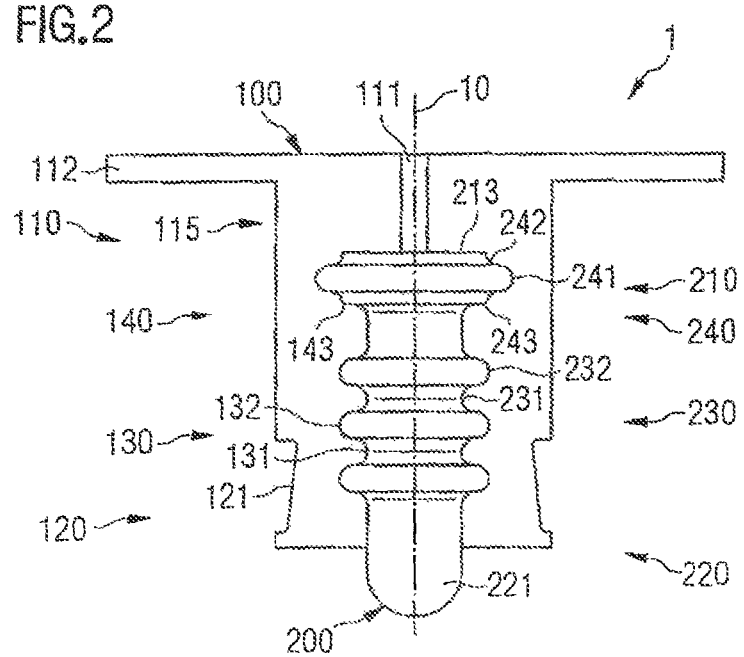
FIG. 2 is a schematic side view of the valve of FIG. 1.

The schematic side view of FIG. 2 shows further details of the valve of FIG. 1. In particular, FIG. 2 shows valve 1, casing 100 with cover area 112 and recess 121, core 200, and hole 111. Casing 100 and core 200 are rotationally symmetric around an axis 10. In further embodiments casing 100 and core 200 are not rotationally symmetric and may have, for example, an angular shape, for example a rectangular shape.

Outer end 110 of casing 100 is the end of casing 100 which is connected via cover area 112 with the bladder of a ball. Cover area 112 rests with its lower side (i.e., with the side directed to inner end 120 of casing 100) on the outside of the bladder to which it is connected, for example, by gluing or welding. Accordingly, inner end 120 of casing 100 may be the end which extends into the ball. In analogy to this definition, core 200 has an outer end 210 and an inner end 220.

Recess 121 for receiving an electromagnetic coil may be located at inner end 120 of casing 100. In the embodiment of FIG. 2, recess 121 may be inclined with respect to axis 10 towards the outer end 110 of casing 100. In other embodiments, recess 121 may have a different inclination and/or a different shape; for example, recess 121 may run parallel to axis 10, or it may be curved. An electromagnetic coil arranged in recess 121 can be used as a counter weight for balancing further electronic devices arranged inside a ball which will be explained in connection with FIG. 9 below. Alternatively, a simple weight or other means can be arranged in recess 121.

FIG. 2 further shows an area 115 arranged between cover area 112 of casing 100 and outer boundary 213 of core 200. The height of area 115 has been chosen such that it is suitable to arrange indentations for receiving lighting means. This will be explained in more detail in connection with FIG. 4 below.

FIG. 2 also shows further features of core 200, in particular a first sealing area 230 arranged between inner end 220 and outer end 210 of core 200. The first sealing area 230 may comprise a plurality of alternating concave sections 231 and convex sections 232, wherein the sections abut on each other. Alternatively, an adjacent concave section 231 and convex section 232 can be separated by a straight section. Each convex section 232 may engage a corresponding concave section 132 of a second sealing area 130 of casing 100, and each concave section 231 of core 200 may engage a corresponding convex section 131 of casing 100. Casing 100 therefore encloses core 200 so that there are no spaces between core 200 and casing 100 and thereby enables a high air tightness of valve 1.

In the embodiment of FIG. 2, concave sections 231 and convex sections 232 of core 200 are arranged in an alternating sequence and abut on each other. In one embodiment, the first sealing area 230 shown in FIG. 2 may have three convex sections 232 with two concave sections 231 arranged between them. Therefore, the corresponding second sealing area 130 of casing 100 may have three concave sections 132 and two convex sections 131. In alternative embodiments this sequence of convex and concave sections can be varied. In particular, a concave section may be followed by another concave section. Similarly a convex section may be followed by another convex section. In a further embodiment (not illustrated) the first sealing area may have only one concave and one convex section which abut each other. In still another embodiment (not illustrated) the first sealing area may include two convex sections and one concave section arranged between them.

A sequence of concave and convex sections may provide increased air tightness between core 200 and casing 100. In contrast, it has been determined that the planes and edges of valves known from the prior art, for example rectangular indentations or projections, lead to air leakage. One reason for this air leakage is that deformations of planes and edges may lead to displacements between the surfaces of the core and the casing. This may then create cavities through which air can escape. Therefore, the first sealing area 230 of core 200 (thus also the second sealing area 130 of casing 100) may be continuously curved so that this area has no edges or planes to minimize the creation of cavities through which air can escape.

In the embodiment of FIG. 2 it can also be recognized that the curvature radii of concave and convex sections 231, 232 may be essentially equal (except for usual manufacture tolerances). This simplifies the method of manufacture, for example machining of a mould for core 200.

FIG. 2 also shows that the shape of concave and convex sections 231, 232 may be essentially semicircular. This shape leads to a maximum contact surface between the first sealing area 230 and the second sealing area 130 and to an optimum engagement of both sealing areas which improves the air tightness.

FIG. 2 also shows that inner end 220 of core 200 may extend beyond casing 100 where it may be terminated by a hemisphere 221. The shape of a hemisphere 221 improves air tightness of the valve. The thin pipe 211 (see FIG. 1) for inserting a pump into the inside of the ball has its exit point in the area of the hemisphere 221. Since the air pressure inside the ball evenly compresses hemisphere 221 from all sides and directions, tube 211 is also compressed, which avoids air leakage through tube 211. A further advantage of a hemisphere is that it can be easily manufactured and does not require trimming.

FIG. 2 further shows a third sealing area 240 may be arranged at outer end 210 of core 200 which has a convex section 241 and two concave sections 242. In some embodiments, unlike the first sealing area 230, the third sealing area 240 may have one or more first edges 243. In addition, the third sealing area 240 may have a larger diameter than the first sealing area 230. Third sealing area 240 therefore may provide a firm positioning of core 200 inside casing 100 in case of forces acting along axis 10. This may be the result of the larger diameter and edges 243 preventing displacements along axis 10. Such forces arise, for example, during insertion and extraction of a ball pump. Arranging the third sealing area 240 at outer end 210 of core 200 is therefore particularly advantageous since the ball pump exerts particularly large forces exactly at this point.

Third sealing area 240 corresponds in turn to a fourth sealing area 140 of casing 100, as in the case of the first sealing area 230 and the second sealing area 130. The fourth sealing area 140 may have one or more second edges 143 which engage the corresponding first edges 243 of core 200.

Figure 3:
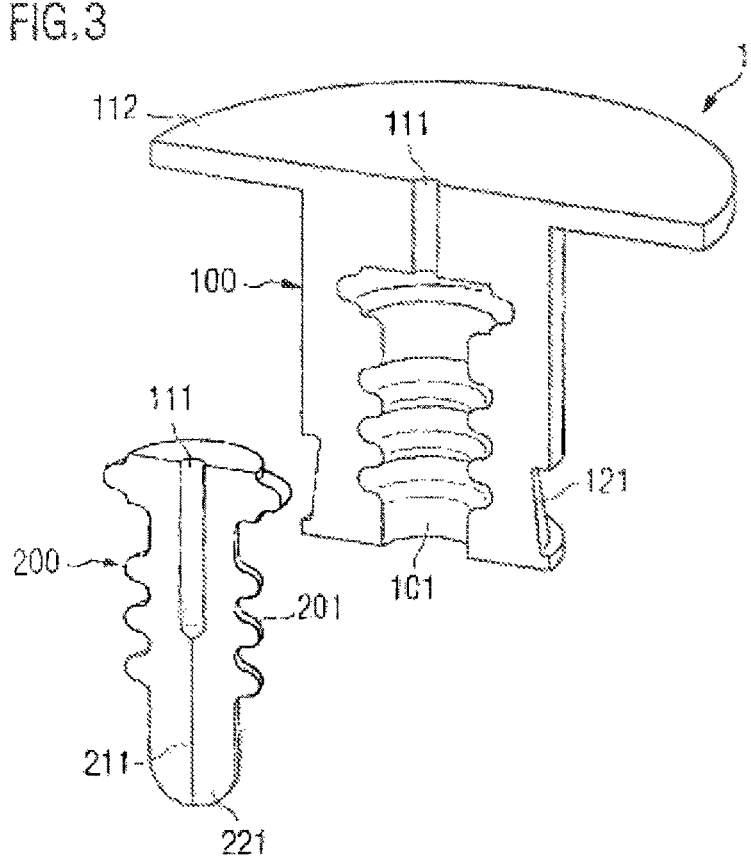
FIG. 3 is an exploded view of the cross-section of FIG. 2.

FIG. 3 is an exploded view of the cross section of FIG. 1 in which valve 1, casing 100 with cover area 112 and recess 121, core 200, hole 111 and thin pipe 211 can be recognized. FIG. 3 shows particularly well how cavity 101 of casing 100 corresponds to core 200 which provides a flush fit and therefore air tightness between casing 100 and core 200. Since both, core 200 and casing 100, may be made from elastic materials, valve 1 is air tight also during deformations. FIG. 3 also illustrates how the strong curvature may increase surface 201 of core 200 and thereby improves air tightness of valve 1.

According to the conventional method of manufacture of a valve, the casing and the core are produced separately, and the core is subsequently pressed through an opening into the casing. As already mentioned in the introduction, this method has several disadvantages. In particular, the casing is stretched during insertion and may be damaged. Further, the shape of the core has to be limited so that it can be introduced into the casing. The larger the diameter of the core, the more difficult is the insertion into the casing and the risk of damages. It is therefore desired to have a method of manufacture which does not require inserting core 200 into casing 100. This has the further advantage of eliminating a step of the manufacturing process.

Such a method of manufacture of valve 1 which represents a further aspect of the present invention may essentially comprise two steps. In the first step, core 200 may be produced from a first elastic material. In some embodiments, the first elastic material may be a rubber material. Core 200 may be formed by pressing or injection molding. Alternatively, the first material may be TPU (Thermoplastic Polyurethane), in which case core 200 may be produced by injection molding. In alternative embodiments, core 200 may be made from other elastic materials and the related production methods.

In the second step, casing 100 may be injection-molded around the core using a second material which may be transparent and which may be TPU. In alternative embodiments, casing 100 may be made from different elastic materials and the related production methods. Next, core 200 may be punctured with a needle to generate thin tube 211 as an extension of hole 111. The needle may exit core 200 at the top of hemisphere 221.

In some embodiments, core 200 may be arranged in a mold after its production, i.e. after the first step, and in the second step the casing may be formed in the mold by injection molding around core 200. The mold may be a conventional mold as used for the manufacture of plastic parts. Use of a mold enables the application of advantageous shaping techniques of which injection molding is particularly preferred. However, other techniques such as pressing or extruding are conceivable.

In some embodiments, the core may be held in place by at least one needle. For example, core 200 can be held in place in the mold by a fixture, in particular a needle, placed in hole 111.

For the manufacture of a ball, valve 1 is connected to the bladder of a ball. In particular, casing 100 is pushed through an opening into the bladder. The diameter of the opening is essentially equal to the diameter of the casing 100 at the inner end 120 (see FIG. 2). Next, the bottom side of the cover area 112 is connected to the outside of the bladder, for example by gluing or welding.

Figure 4:
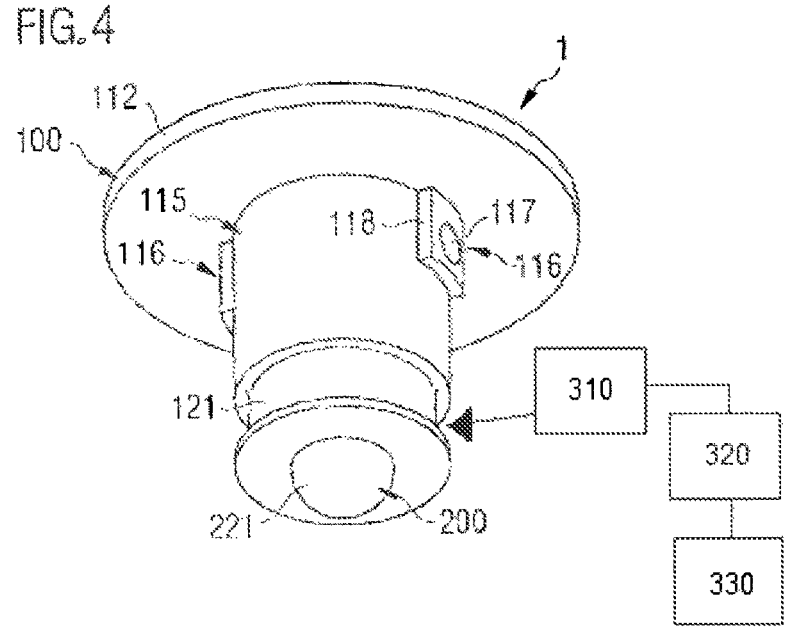
FIG. 4 is a perspective view of an embodiment of a valve for a ball according to the present invention.

FIG. 4 is a perspective view of an embodiment of a valve for a ball. Valve 1, casing 100 with cover area 112 and recess 121 can be recognized in the figure. In this view, only hemisphere 221 of core 200 is visible.

Casing 100 can be manufactured, for example, from TPU or rubber material (such as vinyl). In order to provide a good connection between casing 100 and the bladder, the bladder may be produced from the same material as casing 100. In some embodiments transparent or translucent material may be utilized since it is cheaper than TPU.

In the embodiment of FIG. 4, it can be further recognized that one or more receptacles 116 for lighting means may be arranged in area 115 below cover area 112 of casing 100. Receptacle 116 may include an indentation 117 in easing 100 for receiving the lighting means and a bracing 118 of casing 100. In this way, casing 100 can be used as a housing for the lighting means which emit their light to the outside through cover area 112 of a transparent casing 100. This eliminates the need for separate housings for the lighting, means. The light may escape either through projections arranged on casing 100 or through holes in casing 100 arranged above the lighting means and through further openings in the layers of the ball (carcass and outer layer) above the valve to the outside.

The dimensions discussed below with respect to FIGS. 5 to 8 are merely exemplary and the specified dimensions may deviate therefrom in other embodiments.

Figure 5:
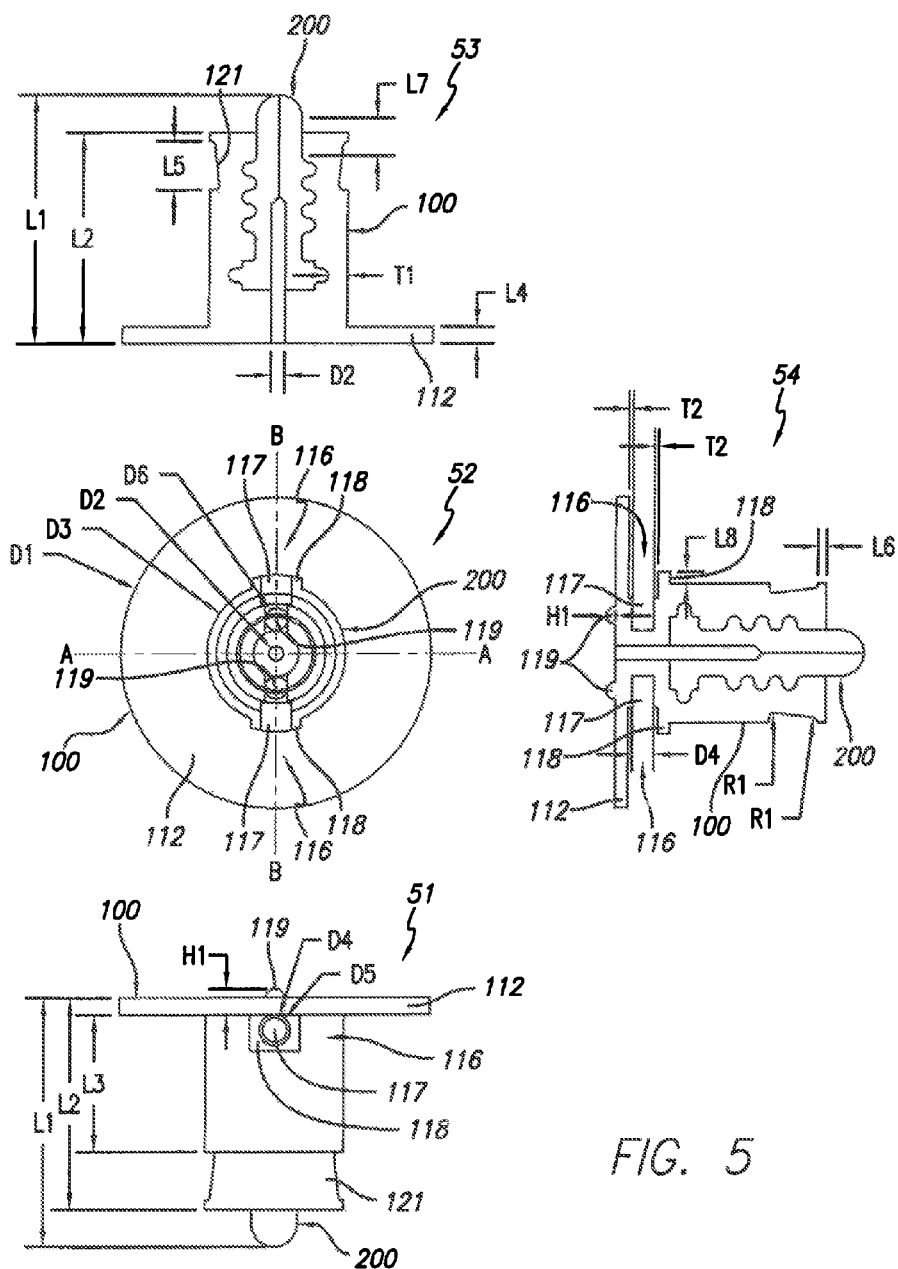
FIG. 5 shows schematic representations of an embodiment of a valve for a ball according to the present invention.

FIG. 5 shows schematic representations of an embodiment of a valve for a ball. This figure shows a side view 51, a bottom view 52, a cross section 53 along the line A-A from bottom view 52, and a cross section 54 along the line B-B from bottom view 52. In these views, casing 100 with cover area 112 and recess 121 for receiving an electromagnetic coil as well as core 200 can be recognized. In one embodiment, the valve may have a length L1 of about 25.3 mm. Casing 100 may have a length L2 of 21.50 mm. A distance L3 from a bottom side of cover area 112 to the beginning of recess 121 may be about 14.20 mm. A distance L4 from a top side of cover area 112 to a bottom side of cover area 112 may be about 1.5 mm. Cover area 112 may have a diameter D1 of about 32.0 mm. Hole 111 may have a diameter D2 of about 1.5 mm. A distance L5 from one end of recess 121 to another end of recess 121 as measured along an axis of the valve may be about 5.0 mm. Recess 121 may have a radius of curvature R1 at each end of about 0.3 mm. A distance L6 between a lower end of recess 121 and a lower end of casing 100 may be about 0.8 mm. Convex section 241 of core 200 may have a diameter D3 of about 14.5 mm. A thickness T1 of casing 100 corresponding to convex section 241 of core 200 may be about 2.08 mm. A distance L7 between the lowest of concave sections 132 of casing 100 and a lower end of casing 100 may be about 2.2 mm.

FIG. 5 further shows in views 51, 52, and 54 receptacles 116 for lighting means, each with an indentation 117 and a bracing 118. In one embodiment, receptacles 116 may have a substantially circular cross-section having an inner diameter D4 of about 2.0 mm, an outer diameter D5 of about 3.0 mm, and a thickness T2 of about 0.5 mm. Bracing 118 may extend from casing 100 a distance L8 of about 1.0 mm. In the embodiment of FIG. 5, hemispherical projections 119 may be arranged on cover area 112 of (transparent) casing 100. The projections 119 may be arranged above indentations 117 for receiving the lighting means. Projections 119 emit the light of the lighting means broadly and therefore provide a good visibility of the lighting means. Small openings may be provided in the layers of the ball (carcass and outer layer) above projections 119 to enable escape of the light. Projections 119 may have a height which corresponds to the thickness of the layers of the ball. In one embodiment, the height H1 of projections 119 may be about 1.0 mm. In one embodiment, projections 119 may be hemispherical and may have a diameter D6 of about 2.0 mm.

Figure 6:
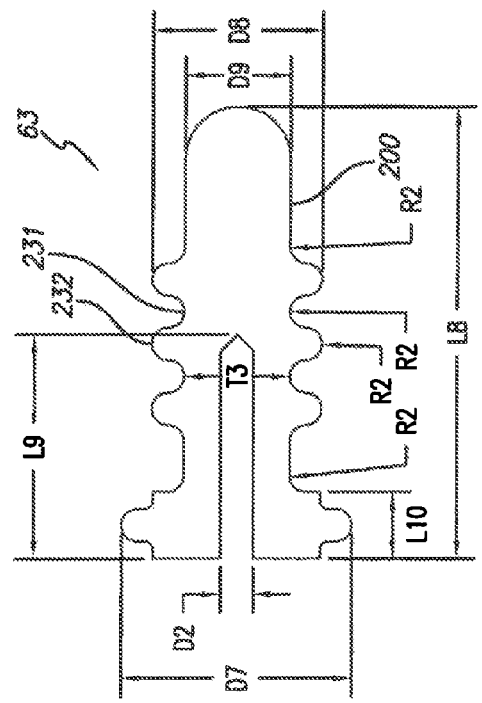
FIG. 6 shows schematic representations of an embodiment of a core of a valve according to the present invention.
Figure 6:
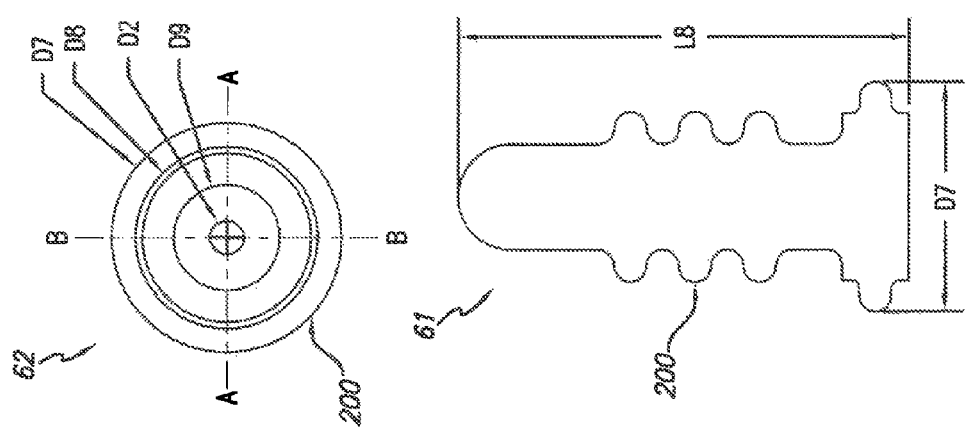

FIG. 6 is a schematic representation of a preferred embodiment of a core for a valve of a ball. This figure shows a side view 61, a bottom view 62 and a cross-section 63 along the line B-B from the bottom view 62 of a core 200. In one embodiment the radius of curvature R2 of each of concave sections 231 and convex sections 232 of core 200 may be about 0.75 mm. Core 200 may have a length L8 of about 20.0 mm. Convex section 241 of casing 200 may have a diameter D7 of about 10.5 mm. Hole 111 of core 200 may have a diameter D2 of about 1.50 mm and may have a length L9 of about 10.0 mm in core 200. Convex sections 232 of core 200 may have a diameter D8 of about 8.0 mm. Hemisphere 221 of core 200 may have a diameter D9 of about 5.0 mm. Third sealing area 240 of core 200 may have a length L10 of about 3.0 mm. A thickness T3 of core 200 at concave sections 231 may be about 5.0 mm.

Figure 7:
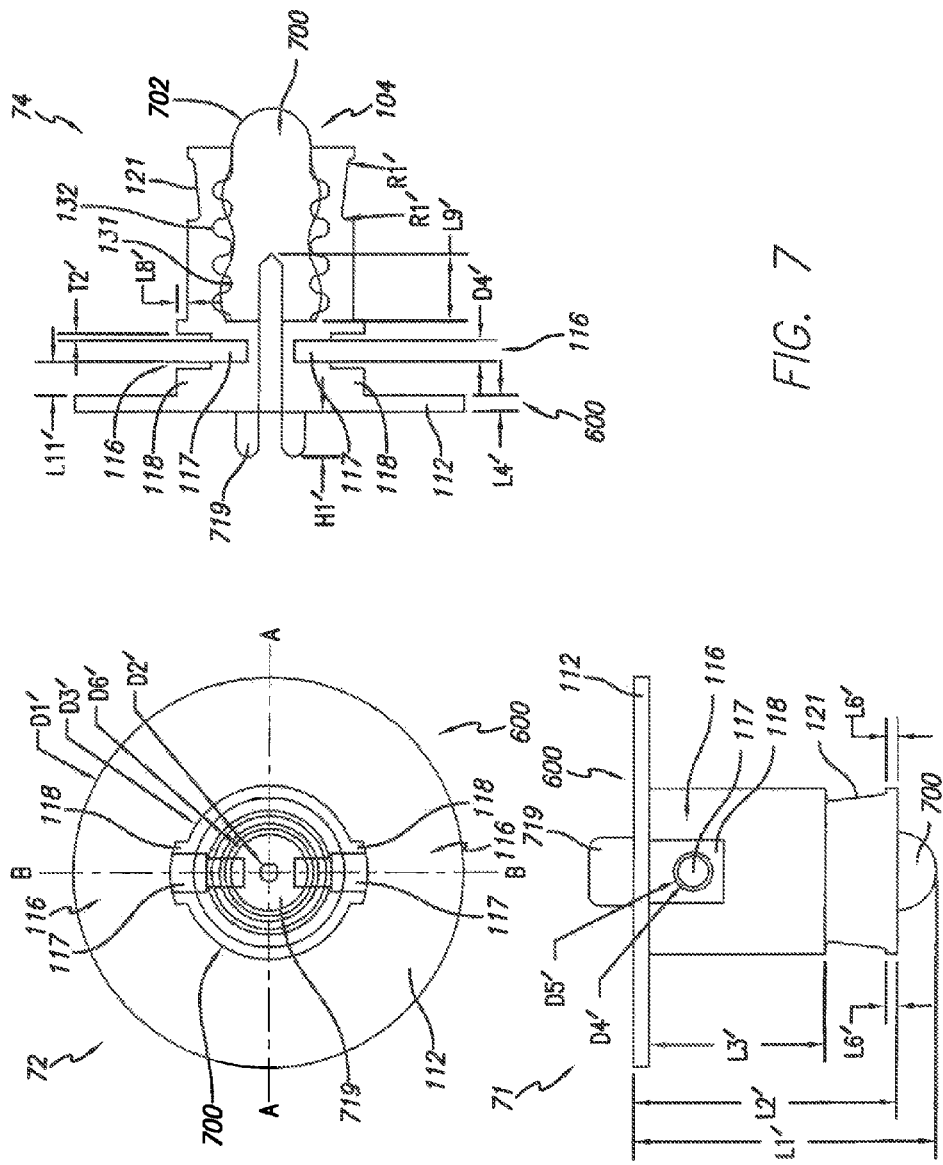
FIG. 7 shows schematic representations of an embodiment of a valve for a ball according to the present invention.

FIG. 7 is a schematic representation of a further embodiment of a valve for a ball. This figure shows a side view 71, a bottom view 72, and a cross-section 74 along the line B-B from bottom view 72. A casing 600 with cover area 112 and recess 121 for an electromagnetic coil as well as a core 700 can be recognized.

In the embodiment of FIG. 7 the (outer) contour 702 of core 700 does not correspond to the (inner) contour, comprising concave 132 and convex 131 sections, of casing 600, in contrast to the previously described embodiments. Rather, contour 702 of core 700 is only slightly curved and comprises essentially only one concave section 731 and two adjacent convex sections. By contrast, the contour of casing 600 is curved much stronger and comprises several concave sections 132 and convex sections 131, for example four concave sections 132 and three convex sections 131, which can be recognized in view 74.

Core 700 and casing 600 may be separately manufactured, and core 700 may be subsequently inserted into casing 600. Since core 700 may be made from an elastic material (for example rubber) and since casing 600 may be made from an elastic material (for example TPU), core 700 may adjust its form to casing 600. Before inserting core 700 into casing 600, the contours of core 700 and casing 600 are different. While core 700 is inserted, its contour adjusts to the contour of casing 600. FIG. 7 shows casing 600 and the inserted core 700, wherein core 700 still has its original contour which is not yet adjusted to the contour of casing 600.

Before inserting core 700 into casing 600, the contour of casing 600, comprising concave 132 and convex 131 sections, is not flush with contour 702 of core 700. Nevertheless, also in this embodiment the valve is leak tight since in particular the convex sections 131 of casing 600 exert a high pressure on contour 702 of core 700 so that leak tightness is secured.

In one embodiment, the valve may have a length L1' of about 25.3 mm. Casing 100 may have a length L2' of 21.50 mm. A distance L3' from a bottom side of cover area 112 to the beginning of recess 121 may be about 14.20 mm. A distance L4' from a top side of cover area 112 to a bottom side of cover area 112 may be about 1.5 mm. Cover area 112 may have a diameter D1' of about 32.0 mm. Hole 111 may have a diameter D2' of about 1.5 mm and may have a length L9' of about 5.5 mm in core 700. Recess 121 may have a radius of curvature R1' at each end of about 0.3 mm. A distance L6' between a lower end of recess 121 and a lower end of casing 100 may vary from one end to another to create an unsymmetrical contour. For example, as shown in view 74 distance L6' on a left side of the valve may be about 0.8 mm and distance L6' on a right side of the valve may be about 2.0 mm. Concave sections 131 of casing 600 may have a diameter D3' of about 14.5 mm.

Views 71, 72 and 74 of FIG. 7 further show receptacles 116 for lighting means, wherein each receptacle 116 has an indentation 117 and a bracing 118. In one embodiment, receptacles 116 may have a substantially circular cross-section having an inner diameter D4' of about 2.0 mm, an outer diameter D5' of about 3.0 mm, and a thickness T2' of about 0.5 mm. Bracing 118 may extend from casing 100 a distance L8' of about 1.0 mm. A distance L11 between a lower side of cover area 112 and receptacle 116 may be about 2.5 mm. In the embodiment of FIG. 7, a projection 719 may be arranged in the center of cover area 112 of (transparent) casing 100, in contrast to projections 119 in FIG. 5. In some embodiments projection 719 may have a cylindrical shape. Projection 719 collects the light from the lighting means which are arranged in indentations 117 below projection 719 and emits the collected light broadly. This may provide a good visibility of the lighting means. In one embodiment, the height H1' of projection 719 may be about 3.5 mm. In one embodiment, projection 719 may be hemispherical and may have a diameter D6' of about 6.0 mm.

Figure 8:
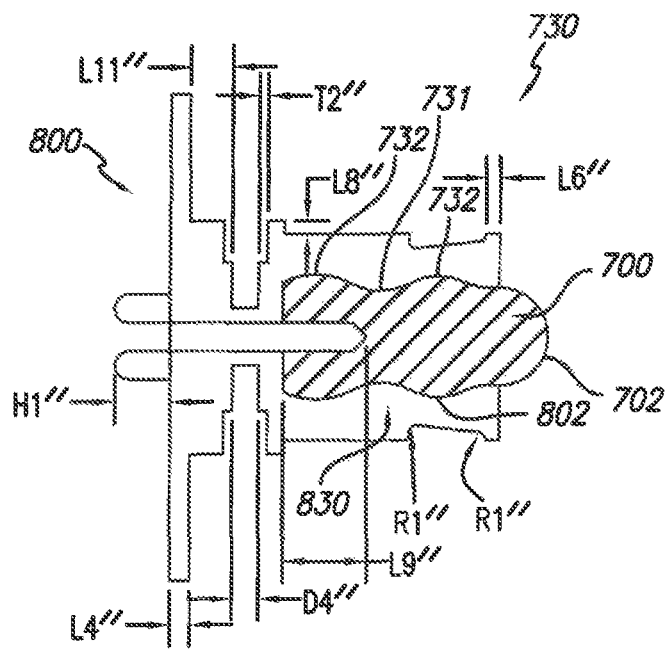
FIG. 8 is a schematic representation of an embodiment of a valve for a ball according to the present invention.

FIG. 8 is a schematic representation of a further embodiment of a valve for a ball with a casing 800 and a core 700. In contrast to the embodiment of FIG. 7, contour 802 of casing 800 may correspond to contour 702 of core 700, so that both contours are flush and provide high leak tightness. Contour 702 of core 700 may be only slightly curved, similar to FIG. 7, and may comprise a first sealing area 730 with a concave section 731 and two convex sections 732. Correspondingly, contour 802 of casing 800 may be only slightly curved and comprise a second sealing area 830 corresponding in shape to the first sealing area 730. The flush fit of the contours and their slight curvature may simplify insertion of core 700 into casing 800 and reduce the risk of damage. Dimensions in FIG. 8 denoted with a " may represent the same dimension denoted by a ' in the embodiment of FIG. 7 and may have the same measurement.

Core 700 and casing 800 can separately manufactured, wherein core 700 is inserted into casing 800 after manufacture. Alternatively, casing 800 can be injection-molded around core 700.

A further aspect of the present invention relates to a ball which comprises a valve 1 as described above. Such a ball further comprises an electronic device and an energy storage. The energy storage can be inductively charged by an electromagnetic coil which is formed by windings in recess 121 of casing 100. This avoids the need for a further component, i.e. an electromagnetic coil, inside the ball. States of the electronic device can be displayed by lighting means which are arranged in one or more receptacles 116 of casing 100. For example, a red lighting means can display a too low and/or a too high pressure of the ball, and a green lighting means can display an adequate pressure inside the ball. Alternatively, a single lighting means may be used. One or more lighting means may display the charging state of the energy storage (for example, a battery or a capacitor). As mentioned above, the electronic device may comprise a pressure sensor, an acceleration sensor, a temperature sensor and further sensors and circuitry for measuring properties of the ball, its position and its motion.

Figure 9:
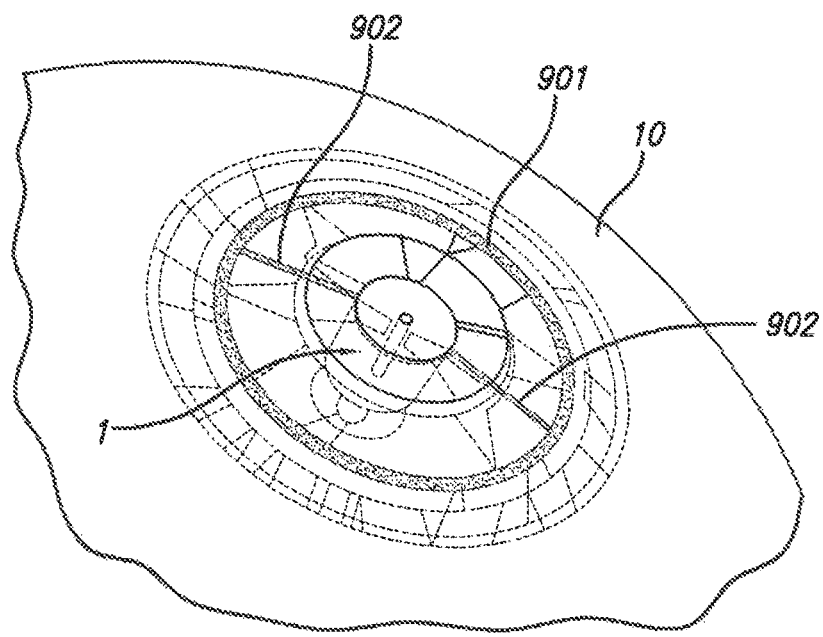
FIG. 9 is an embodiment of a valve and an electromagnetic coil according to the present invention.

FIG. 9 shows an alternative embodiment of a valve and an electromagnetic coil. A bladder 10 of a ball having a valve 1 and an electromagnetic coil 901 can be recognized. Electromagnetic coil 901 is arranged on bladder 10 and surrounds valve 1 in a circular arrangement. In further embodiments, electromagnetic coil 901 is arranged at other positions on bladder 10, wherein the distance to an electric magnetic field of a charging station is relevant. The closer electromagnetic coil 901 is located to the electromagnetic field of a charging station, the faster an energy storage connected to electromagnetic coil 901 can be charged, and the less energy is needed. Arranging electromagnetic coil 901 on bladder 10, wherein the electromagnetic coil 901 is arranged in a circular arrangement around valve 1, may result in a particularly short distance to the electromagnetic field of a charging station and thereby may enable fast charging.

FIG. 9 further shows that electromagnetic coil 901 may be connected by connection wires 902 to valve 1. In one embodiment, electromagnetic coil 901 may be arranged in a tunnel of bladder 10. In further embodiments, electromagnetic coil 901 may be attached to bladder 10 by other fixing means, for example gluing or welding.

Figure 10:
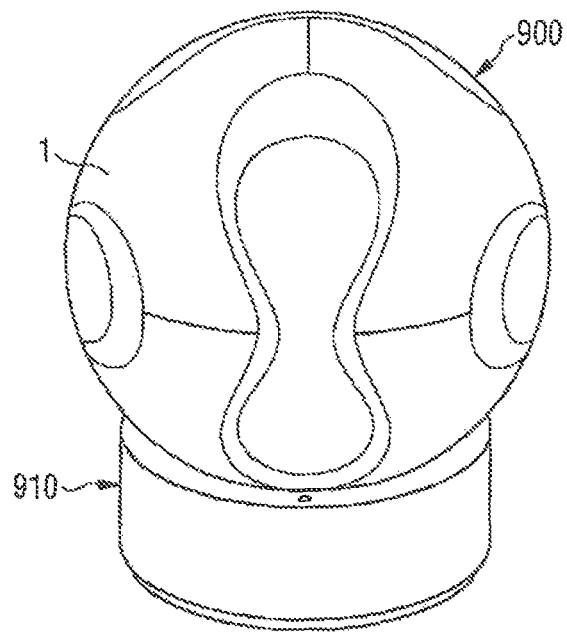
FIG. 10 is an embodiment of a charging station for a ball which has an energy storage according to the present invention.

FIG. 10 shows an embodiment of a charging station 910 for a ball 900 having an energy storage. As shown, ball 900 may be placed in charging station 910 for charging the energy storage. To this end, valve 1 (not visible) of ball 900 is brought into the proximity of a charging coil (not illustrated) of charging station 910. Therefore, charging station 910 may be designed so that the ball can be easily rotated. Charging station 910 can be equipped with a display which signals when the coil inside the ball is sufficiently close to the charging coil of charging station 910 and when charging is finished.

Figure 11:
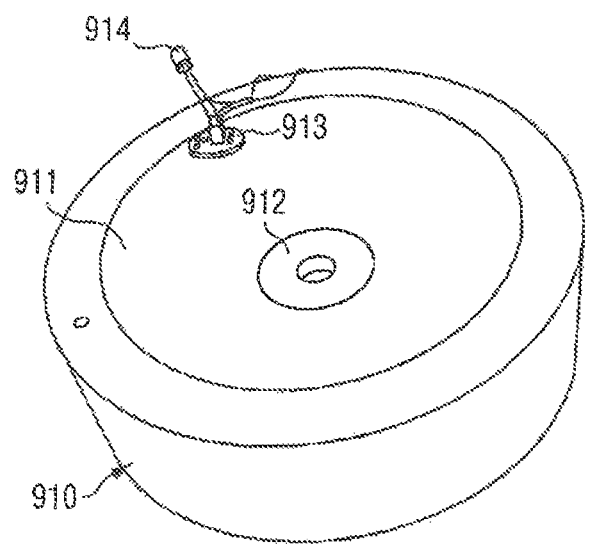
FIG. 11 is a further embodiment of a charging station for a ball which has an energy storage according to the present invention.

FIG. 11 shows a further embodiment of a charging station for a ball having an energy storage. The illustrated charging station 910 may have a recess 911 for a ball. Further, charging station 910 may have a display 914 in a controller 913, for example a microcontroller, which is removed from charging station 910 in the representation of FIG. 11. Normally, controller 913 may be arranged inside charging station 910. Display 914 can be arranged, for example, at the surface of charging station 910.

Display 914 may indicate whether a ball is in an adequate position in the charging station 910 for charging an energy storage inside the ball. To this end, charging station 910 may have a second electromagnetic coil which can be arranged, for example, at the bottom of recess 911. In further embodiments, the second electromagnetic coil 912 can be arranged at other positions of charging station 910.

An electromagnetic coil inside the ball may send a signal to the second electromagnetic coil 912. Controller 913 of charging station 910 may measure the signal which changes according to the different orientations of the ball inside charging station 910 with respect to the second electromagnetic coil 912. Controller 913 may recognize when the electromagnetic coil inside the ball is in an adequate position for charging. An adequate position for charging may be displayed by display 914. In further embodiments, several displays may be used, also with different colors. The brightness of the display can be used to indicate the distance of the electromagnetic coil inside the ball to an adequate position for charging.

Arranging one or more electronic devices and energy storages inside a ball requires balancing the ball, in order to avoid a negative impact on a smooth motion of the ball. In this respect it is advantageous if the valve is used as a mounting for an electromagnetic coil since this avoids a further component inside the ball. This also saves weight. Further, the valve and the electromagnetic coil itself can be used as a counterweight for an energy storage and an electronic device. It is even possible to use the valve and the electromagnetic coil as a variable counter weight for balancing by varying the shape of recess 121 (see FIGS. 1 to 5 and 7), material, wire thickness, number of windings and other parameters of the electromagnetic coil.

What is claimed is:
1. A ball comprising:
a valve comprising a valve casing and a valve core at least partially disposed inside the valve casing;
an electromagnetic coil disposed about an inner end of the valve casing;
an energy storage configured to be inductively charged by the electromagnetic coil; and
an electronic device coupled to the energy storage.
2. The ball of claim 1, wherein the electromagnetic coil is disposed in a recess of the valve casing.

3. The ball of claim 1, wherein the electronic device is a sensor.

4. The ball of claim 1, wherein the electronic device is a sensor for measuring the position of the ball.

5. The ball of claim 1, wherein the electronic device is a sensor for measuring the motion of the ball.

6. The ball of claim 1, wherein the electronic device is an acceleration sensor.

7. The ball of claim 1, wherein the electronic device is a pressure sensor.

8. A ball comprising:
a bladder;
a valve coupled to the bladder and comprising a valve casing and a valve core at least partially disposed inside the valve casing;
an electromagnetic coil disposed within a tunnel of the bladder;
an energy storage configured to be inductively charged by the electromagnetic coil; and
an electronic device coupled to the energy storage,
wherein the electromagnetic coil is disposed on the bladder in a circular arrangement around the valve.

9. The ball of claim 8, wherein the electronic device is a sensor.

10. The ball of claim 8, wherein the electronic device is a sensor for measuring the position of the ball.

11. The ball of claim 8, wherein the electronic device is a sensor for measuring the motion of the ball.

12. The ball of claim 8, wherein the electronic device is an acceleration sensor.

13. The ball of claim 8, wherein the electronic device is a pressure sensor.

14. A ball comprising:
a bladder;
a valve coupled to the bladder;
an electromagnetic coil coupled to the bladder;
an energy storage configured to be inductively charged by the electromagnetic coil; and
an electronic device coupled to the energy storage and disposed at an opposite side of the bladder from the electromagnetic coil,
wherein the electromagnetic coil is disposed on the bladder in a circular arrangement around the valve.

15. The ball of claim 14, wherein the electromagnetic coil is formed of a wire having a thickness and a number of windings, and
wherein the thickness and the number of windings is based on a weight of the electronic device.

* * * * *